United States Patent [19]
Back et al.

[11] Patent Number: 5,868,937
[45] Date of Patent: Feb. 9, 1999

[54] PROCESS AND SYSTEM FOR RECYCLING AND REUSING GRAY WATER

[75] Inventors: Dwight Douglas Back, Melbourne; Robert Peter Scaringe, Rockledge; Charlie Ramos, Satellite Beach; Nidal Abdul Samad, Palm Bay; Steven Dale Gann, Sr., Merritt Island, all of Fla.

[73] Assignee: Mainstream Engineering Corporation, Rockledge, Fla.

[21] Appl. No.: 600,460

[22] Filed: Feb. 13, 1996

[51] Int. Cl.$^6$ .................................................. B01D 61/00
[52] U.S. Cl. .......................... 210/651; 210/650; 210/805; 210/167; 210/257.2; 210/195.2; 210/98
[58] Field of Search ..................................... 210/167, 650, 210/651, 257.2, 195.2, 652, 653, 660, 764, 110, 136, 100, 760, 805, 98; 4/557, 601, 665, 415; 68/18 F, 18 R

[56] References Cited

U.S. PATENT DOCUMENTS

| | | | |
|---|---|---|---|
| 3,772,901 | 11/1973 | Ferraro | 210/199 |
| 4,104,164 | 8/1978 | Chelton | 210/136 |
| 4,145,279 | 3/1979 | Selby, III | 210/167 |
| 4,162,218 | 7/1979 | McCormick | 210/167 |
| 4,277,336 | 7/1981 | Henschel, Jr. | 210/167 |
| 4,828,709 | 5/1989 | Houser et al. | 210/195.1 |
| 5,059,330 | 10/1991 | Burkhardt | 210/744 |
| 5,093,012 | 3/1992 | Bundy et al. | 210/767 |
| 5,106,493 | 4/1992 | McIntosh | 210/100 |
| 5,147,532 | 9/1992 | Leek et al. | 210/167 |
| 5,160,430 | 11/1992 | Gasser et al. | 210/138 |
| 5,160,606 | 11/1992 | De Simone et al. | 210/110 |
| 5,173,180 | 12/1992 | Steward et al. | 210/167 |
| 5,243,719 | 9/1993 | McDonald et al. | 4/415 |
| 5,288,412 | 2/1994 | Voorhees et al. | 210/739 |
| 5,317,766 | 6/1994 | McDonald et al. | 4/415 |
| 5,353,448 | 10/1994 | Lee | 4/597 |
| 5,452,956 | 9/1995 | Gilliam | 210/167 |
| 5,498,330 | 3/1996 | Delle Cave | 210/167 |
| 5,503,735 | 4/1996 | Vinas et al. | 210/167 |

OTHER PUBLICATIONS

Design of an Ultrafiltration/Reverse Osmosis Prototype Subsystem for the Treatment of Spacecraft Wastewaters, McCray et al., SAE Technical Paper Series 951738, Jul. 10–13, 1995, 11 pages.

Reverse Osmosis Treatment of Selected Shipboard Generated Waste Streams, Adamson et al., ASME, 74–ENAs–12, 10 pages, Apr. 24, 1974.

Development of a Reverse Osmosis Module For Wash Water Recycling in a Space Environment at 165 Degrees F, Lawrence et al., NTIS, PB–226 632, 24 pages, Jan. 3, 1974.

Microbiological Aspects of Water Recycle for Laundry Applications, Akkara et al., DoD Technical Report, AD–A193 424, 50 pages, Jun. 1988.

Membrane Ultrafiltration to Treat Laundry Wastes and Shower Wastes for Water Reuse, Grieves et al., SAE 740924, 1974, 11 pages.

(List continued on next page.)

*Primary Examiner*—Ana Fortuna
*Attorney, Agent, or Firm*—Evenson, McKeown, Edwards & Lenahan P.L.L.C

[57] ABSTRACT

A process and system recycles and reuses gray water generated by dishwashers, showers, carwashes, and clothes washers while maintaining the same cleaning performance as current systems. Hollow-fiber membrane ultrafiltration is used to reduce fresh water supply demands and gray water generation where voluminous quantities of the latter are generated. For a clothes washer, the gray water reuse or recycle system consists of a closed-loop water recycle which can be redirected to a storage tank for other applications, or directly used in situ with a clothes washer for subsequent rinse cycles. The process uses, at a minimum, 50% less water than conventional residential and commercial washers, and also decreases detergent requirements by 30% because a portion of the rinse water can be re-used for subsequent wash cycles.

9 Claims, 4 Drawing Sheets

OTHER PUBLICATIONS

Treatment of Wastewater from Detergent Production by Means of Membrane Separation, Bernovskyaya et al., 2 pages, May 1980.

Shipboard Laundry Wastewater Treatment System, Lard et al., ASME 76–ENAs–48, 8 pages, Apr. 1976.

Higher Water, Sewer Rates Fuel Recycling, Leek, Water Technology, Apr. 1995, 3 pages.

Renovation of Waste Shower Water by Membrane Filtration, Lent, Nov. 1976, DoD Technical Report CG–D–25–77, 88 pages.

Carwashes Need You, Survey Finds, Norton, Water Technology, Oct. 1994, 1 page.

A continuous Shipboard Laundry Wastewater Treatment and Recycling System, Van Hees et al., ASME 77–ENAs–40, 8 pages, Apr. 6, 1977.

Laundry Detergents Do Good Things Come In Small Packages, Consumer Reports, Feb. 1995, 2 pages.

Washing Machines What's Ahead? What's In Stores Now?, Consumer Reports, Feb. 1995, 4 pages.

Laundry Detergents, Shaw, Soap/Cosmetics/Chemical Specialties, Jan. 1995, 5 pages.

Carwashes Reclaim Water, Save Money, Stansbury, Water Technology, Oct. 1994, 4 pages.

PROCESS AND SYSTEM FOR RECYCLING AND REUSING GRAY WATER

BACKGROUND AND SUMMARY OF THE INVENTION

The present invention relates to a process and system for recycling and reusing gray water, and more particularly, to a process and system which uses hollow-fiber membrane ultrafiltration in a closed-loop water recycle, such as a clothes washers, also redirectable to a storage tank for other purposes. This invention teaches the immediate use of the permeate generated by gray water membrane separation processes for additional cleaning extractions in clothes washers for equal or better cleaning performance, and also teaches the necessary system components for autonomous, long-life, closed-loop separation with a gray water processing apparatus.

For definitional purposes, "gray water" is defined as lightly contaminated waste water generated by dishwashers, washing machines, sinks, showers, carwashes and bathtubs, such water is relatively free from high-level organic contaminants and bacteria typically found in more contaminated "black water". The origin of gray water also insures that a portion of the constituents are surfactants, contained in soaps and detergents which emulsify and bind with organics in the water.

Membrane filtration is defined as the use of polymeric or ceramic substrates in the form of spiral-wound modules or tubes to separate species in a liquid or gas stream according to molecular size and chemical properties. The spectrum of membrane filtration for liquids varies from reverse osmosis (RO) to microfiltration (MF), between which nanofiltration (NF) and ultrafiltration (UF) fall. The spectrum itself is defined in terms of molecular weight cutoff (MWCO) which is a measure of the molecular sizes (i.e., molecular weight of specie) beyond which the membrane will reject. The assigned values for RO, NF, UF, and MF are nominal, and also depend on the membrane material itself. For the purposes of the following discussion, UF will refer to molecular weight cutoff's in the range of 5,000 to 500,000. For example, species such as endotoxins, pyrogens, virus, bacteria, pigments, dyes, red blood cells, emulsified oils and other organics, asbestos, and pollen can be removed by membranes having MWCO's of nominally 5,000 or less.

The permeate of a membrane filtration system is generally defined as the fluid (gas or liquid) which permeates through the membrane structure, and the retentate is the fluid which does not filter through the membrane structure and is therefore swept across, or out of, the membrane cartridge.

The United States is increasingly burdened with high potable water demands and costly downstream water treatment processes. As a practical matter, the costs for water treatment and supply are ultimately borne by the consumer, so that reductions in these costs, where economically feasible, draw strong political and commercialization support. Military, industrial and residential sources generate voluminous quantities of gray water from dishwashers, washing machines, sinks, showers, and bathtubs. Because thirty-two states have recently adopted codes for reuse of gray water, the engineering impetus for developing robust and economical separation strategies is a reality. The private sector is also being pushed by the Department of Energy (DoE) to develop more efficient, low-water, minimal byproducts washers capable of using cold water.

The treatment and recycling of gray water (e.g., carwash, dishwasher, shower, and laundry) has been explored and put into limited practice during the past twenty years for commercial and military applications. The treatment and recycle scheme depends strongly on the size of the application, chemical and physical properties of the gray water, and logistical requirements of the operation. Currently, most gray water recycle applications have been targeted for carwashes and commercial laundromats, utilizing depth filtration and carbon adsorption as described in U.S. Pat. Nos. 4,104,164 and 5,093,012. As an example of a complicated multi-stepped process, U.S. Pat. No. 4,104,164 describes a waste water treatment process for laundry and carwash water making use of sand filters, centrifugal separators, precipitation of surfactants and other organics, and adsorption media. U.S. Pat. No. 3,772,901 also describes removal of phosphates from clotheswasher water; however, phosphates have generally since been phased out of detergent formulas. The primary concern is now a reduction of gray water generation and, hence, fresh water supply demands placed on municipalities and other primary water suppliers.

Others have demonstrated the physical and chemical separation potential of UF for gray water and other waste streams. The system requirements for an autonomous, closed-loop system have not, however, been recognized, and direct re-use of the permeate stream for subsequent extraction cleaning has not been described. For example, McCray et al. *Design Of An Ultrafiltration/Reverse Osmosis Prototype Subsystem For The Treatment Of Spacecraft Wastewaters* (1995) describe the use of UF having the sole purpose of a prefilter for a reverse osmosis water treatment station aimed at producing potable water. The direct utility of UF permeate for gray water recycle or clothes washer extraction was not recognized or taught. Adamson et al. *Reverse Osmosis Treatment of Selected Shipboard Generated Waste Streams* (1974) and Lawrence et al. *Development of a Reverse Osmosis Module for Wash Water Recycling in a Space Environment,* (1974) also describe systems utilizing RO for wastewater and gray water cleanup, but do not teach the use of UF in closed-loop systems, the required prefilters to increase the life of the system, or the direct re-use of membrane permeate since these studies were aimed at producing potable water. Bhattacharyya et al. *Membrane Ultrafiltration to Treat Laundry Wastes and Shower Wastes for Water Reuse,* (1974) also reports testing UF technologies for gray water component separation, but this separation technology did not involve closed-loop in situ processing of gray water streams such as clothes washers, and the studies did not consider other system requirements and eventual process sequencing of permeate and retentate stream to arrive at a reduction of gray water generation. Lard et al. *Shipboard Laundry Wastewater Treatment Systems,* (1976) also reports investigating a UF membrane system for gray water processing. Only the separation capability of these membranes was reaffirmed, and a functional system using the separation media in a closed-loop autonomous system with permeate reuse for additional extraction cleaning was not demonstrated. As a final example, Lent, *Renovation of Waste Shower Water by Membrane Filtration,* (1976) reports considering bulk treatment of shower water and storage of the permeate using UF. The separation capacity of the UF elements was reinforced; however, application of the technology, along with prescription of the necessary prefilters and sequencing for an autonomous closed-loop system which directly reuses the permeated, was not described.

Gray water can be treated, stored and used for lawn watering or toilet flush water as disclosed in U.S. Pat. Nos. 5,317,766; 5,243,719; 5,106,493; 5,059,330; and 4,162,218.

With additional "polishing" steps such as UV irradiation (U.S. Pat. No. 5,288,412), or ozonation (U.S. Pat. No. 5,160,606), gray water can be reused for more bacteriological-sensitive water streams as shower or dishwashing. Immediate reuse of shower water, without any chemical treatment or separation process has also been disclosed in U.S. Pat. No. 5,353,448. Carwashes for water recycle are also known, as seen in U.S. Pat. No. 5,093,012, which utilize carbon adsorption and diatomaceous earth filters. A carwash gray water recycle system has also been discussed in U.S. Pat. No. 5,160,430 using reverse osmosis (RO) in which the retentate or concentrate is the wash water, and the permeate of the RO system subsequently rinses the vehicles. This system is not, however, continuous and is, therefore, not automatic (i.e., operator controlled).

A commercial laundry can also treat the wash water via membrane filtration and additional polishing steps for reuse in laundry operations. Membrane filtration is particularly well-suited for gray water recycle schemes because it requires considerably lower pressures than RO, and the looser structure of the membrane is more resistant, in general, to fouling associated with particulates and larger chemical species. Cross-flow membrane filtration also allows for continuous processing of gray water. The use of ultrafiltration, nanofiltration, and microfiltration has advantages over RO in water treatment with decreased potential for fouling (due to particulates and high oil/organic-content streams), and decreases operating costs because RO requires high operating pressures.

Reverse osmosis will reject species on an ionic scale (molecular weights of 200–500 and lower), nanofiltration will reject species on a molecular scale (molecular weights of 200–10,000), ultrafiltration will reject species in the macro-molecular scale (molecular weights of 1,000–500,000), and microfiltration will reject species from molecular weights of 100,000 to 1,000,0000 (pore size of 0.05–1 $\mu$m). All four separation categories will reject bacteria, a benefit in recycle systems where bacteria is present. The pressure (i.e., power) and high-pressure plumbing (i.e., system weight) requirements for membrane separation processes decreases from the 400 psia in RO systems to approximately 10–20 psig for MF systems. Aside from the system requirements, the separation results using lower molecular weight cut-off membranes (e.g., RO) may not always be desirable, and the membranes may be more prone to contamination and plugging problems.

An object of the present invention is to provide a complete process and integrated system for recycle and reuse of gray water generated by sources such as clotheswashers, showers, baths, and carwashes without diminishing the cleaning performance of the overall process.

It is also an object of this invention to provide in situ gray water recycling to generate higher-quality water from the gray water source which can subsequently be used for additional cleaning extractions.

Another object of the invention is to allow detergent and builders from the previous wash cycle to be reused, thereby reducing the overall requirements for clothes washing and the chemical quantities required to be processes by municipal water treatment facilities.

It is yet another objective of the present invention to teach the utility of membrane filtration with molecular weight cutoff's greater than those of reverse osmosis for economical permeate re-use for gray water generator processes such as clothes washers.

A still additional object of this invention is to provide process and system requirements from which bacteria, virus, pigments, dyes, blood cells, endotoxins, pyrogens and large-molecular-scale components can be removed in bulk and further processed to a potable quality suitable for re-use in drinking, showering, or dishwashing.

Another object of this invention is to teach the necessary system components and operating parameter for a closed-loop autonomous gray water recycle system, such as a clothes washer, which directly utilizes waste water in the form of permeate water for additional cleaning extractions.

These objects have been achieved in accordance with the present invention by using membrane filtration, namely, ultrafiltration or other membranes having MWCO's in the range of 5,000 to 500,000, and to recycle gray water so as to reuse the permeate directly as a clean-water extraction agent, or indirectly by storage and eventual reuse in applications which can admit lower-quality, non-potable water such as lawn watering, carwashing, and toilet flush water.

An advantage of the present invention is that it can also be used simultaneously with disinfection processes such as those described by in U.S. patent application Ser. No. 08/417,988, filed Apr. 6, 1995 in the names of Nidal A. Samad and Dwight D. Back and entitled WATER DISINFECTION METHOD USING METAL-LIGAND COMPLEXES, the subject matter of which is incorporated by reference herein, or by ozonation, chlorination, or UV irradiation. Membrane filtration facilitates additional chemically-derived disinfection since no by-products are produced as a result of interaction between the gray water separation chemicals and those used for disinfection such as ozone and chlorine.

BRIEF DESCRIPTION OF THE DRAWINGS

These and further objects, features and advantages of the present invention will become more readily apparent from the following detailed description thereof when taken in conjunction with the accompanying drawings wherein.

DETAILED DESCRIPTION OF THE DRAWINGS

Figure 1:
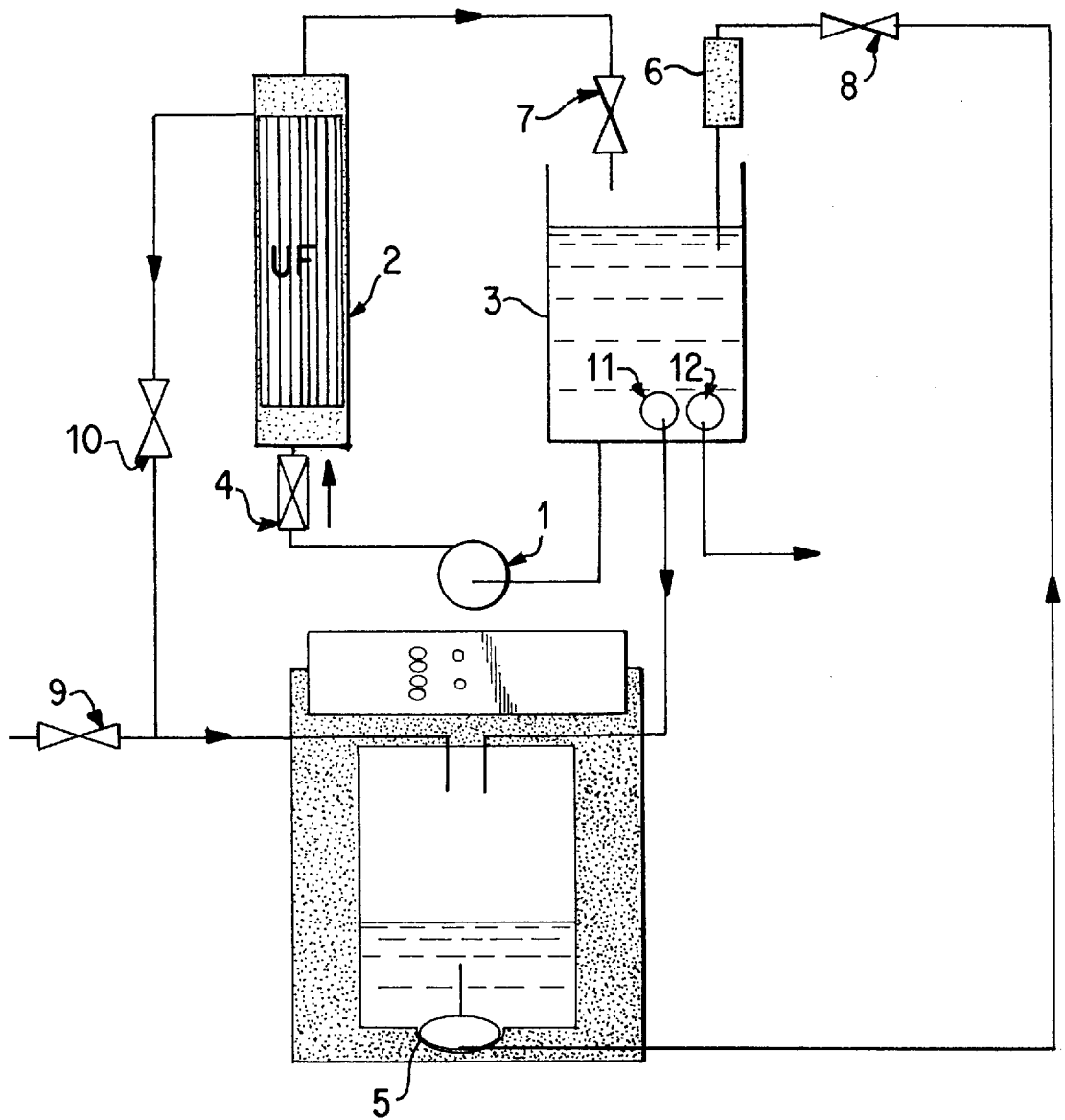
FIG. 1 is a schematic diagram of a clotheswasher system utilizing the present invention for recycling gray water generated during wash and rinse clothes washing cycles.

The process and system of the present invention can be demonstrated with a commercial, high-capacity washer retrofitted to contain the components necessary for the recycle and reuse of clothes washer gray water as schematically shown in FIG. 1. Referring now to FIG. 1, the primary components for the system are a recirculation pump 1, an ultrafiltration cartridge 2 using a membrane filter constructed with hollow fiber cross-flow membrane elements, a gray water processing or holding vessel 3, check valve 4, a washer spin motor and discharge pump 5, and a commercially available high-capacity polyester felt bag prefilter 6 for eliminating debris and lint generated during typical washer operations of agitation and spin. The effective openings of the filters 6 is chosen to reduce plugging which causes an undesirable increase in overall system pressure. Miscellaneous manual control valves 7, 8, solenoid valves 9, 10, and submersible pumps 11, 12 are also usable advantageously to move water from the washer tub to and from the processing vessel 3 as shown by the direction of the arrows, and to control flow rates and pressures in the thus-described membrane filtration recirculation loop in a generally known manner.

In the system of FIG. 1, a closed-loop gray water recycle process is initiated by filling the washer (e.g. a residential washer which is top loaded or front loaded) with a full complement of clothes as specified by the manufacturer of the washer (approximately 8 lb dry clothes on a medium to high water level setting). In addition, 12–30 g of organic contaminants (e.g., dyes, oils, greases, and blood) and 85 grams of an oxygen-bleach detergent containing builders and surfactants (anionic and non-ionic) common to domestic and commercial detergent blends are added to the washer load. The total composition of the organic contaminants is 200–500 ppm by weight for a 60 l (16 gallons) wash volume. These controlled dosages of representative organic substances (i.e., 200–500 ppm), distributed onto the clothes prior to commencement of the wash cycle, provide a consistent measure of cleaning performance by virtue of their extraction from the clothes during the wash and rinse cycles and relative water quality measures, and are also in accordance with the common practice of assessing gray water recycle performance data. See, e.g., Akkara et al. *Microbiological Aspects of Water Recycle for Laundry Applications,* (1988); Bernovskaya et al. *Treatment of Waste Water From Detergent Production by Means of Membrane Separation,* (1981); Van Hees et al. *A Continuous Shipboard Laundry Wastewater Treatment System and Recycling System,* (1977).

Figure 2:
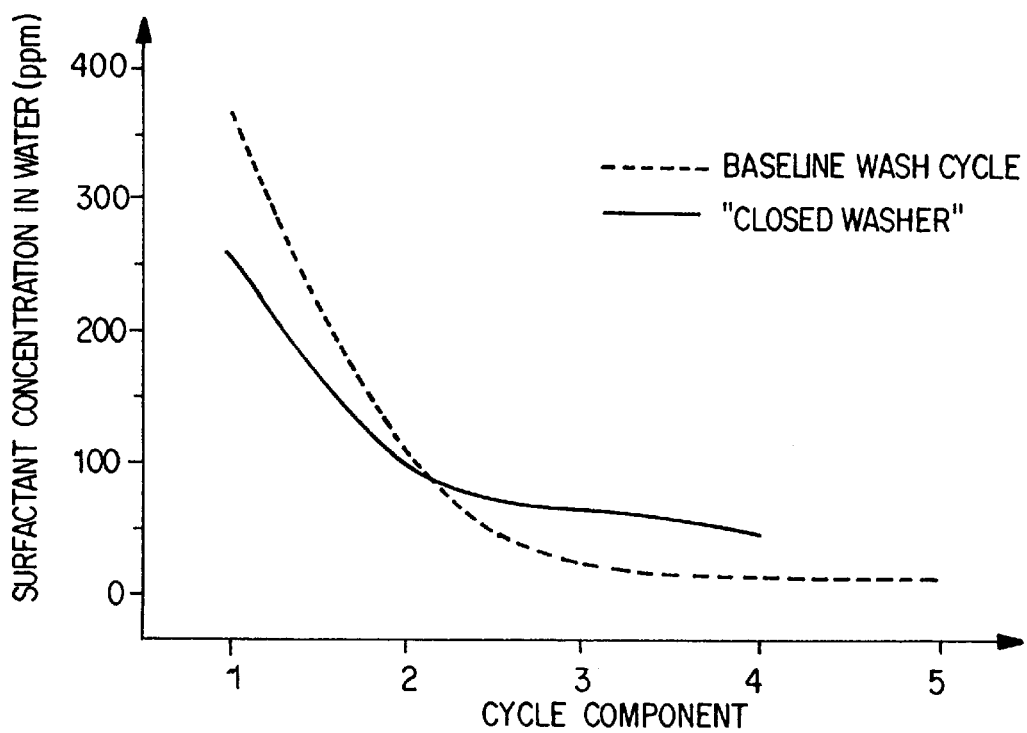
FIG. 2 is a graphical comparison between the measured surfactant concentrations of a 1-wash/4-rinse full-fill clothes washing cycle (baseline wash cycle) and a clothes washing cycle whereby the 2nd rinse and 4th rinse are replaced by water sprays emanating from the permeate of a membrane filtration recycle loop processing gray water generated from the previous wash or rinse cycle (closed washer)
Figure 3:
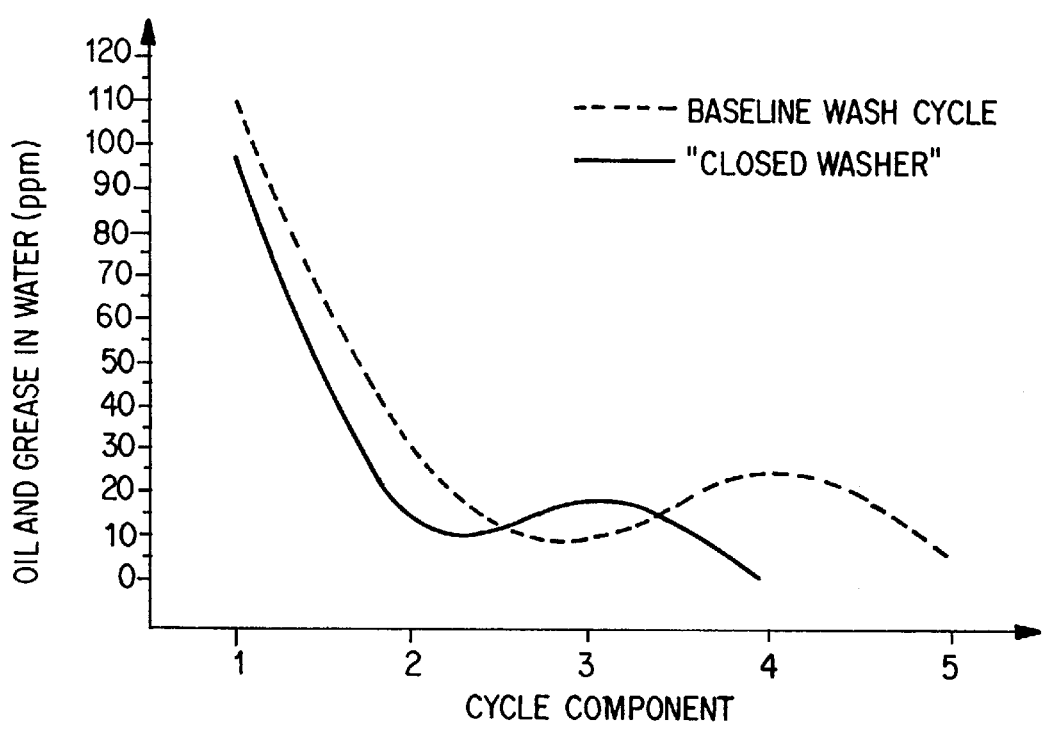
FIG. 3 is a graphical comparison similar to FIG. 2 between the measured vegetable oil, motor oil, and grease concentrations of a 1-wash/4-rinse full-fill clothes washing cycle (baseline wash cycle) and a clothes washing cycle whereby the 2nd rinse and 4th rinse are replaced by water sprays emanating from the permeate of a membrane filtration recycle loop processing gray water generated from the previous wash or rinse cycle (closed washer)

The ultrafiltration system recycles gray water using the permeate as further rinse spray for the clothes during alternate rinse cycles. This system and process have been demonstrated to clean clothes as well or better than wash and rinse cycles whereby the washer tub is completely filled with water. As illustrated in FIGS. 2 and 3, the surfactant, and oil and grease concentrations of the water decreases throughout the cycle and are similar for the closed-loop ultrafiltration cycle and full-fill analogs. The cycle component of the x-axis in FIGS. 2 and 3 represents the following components of the multi-stepped wash-rinse sequence in Table 1. This data demonstrates that the use of permeate as set forth in Table 1 below in the system of FIG. 1, is as effective as a fresh water, full fill agitation wash or rinse cycle.

TABLE 1

| CYCLE COMPONENT | Baseline | "Closed Washer" |
|---|---|---|
| 1 | full-fill wash & discard | fill from process vessel 3 and wash |
| 2 | full-fill rinse & discard | extract spin with wash water in vessel 3 |
| 3 | full-fill rinse & discard | fresh water full fill via 9 and agitate |
| 4 | full-fill rinse & discard | extract-spin with rinse water in vessel 3 |
| 5 | full-fill rinse & discard | n/a |

Figure 4:
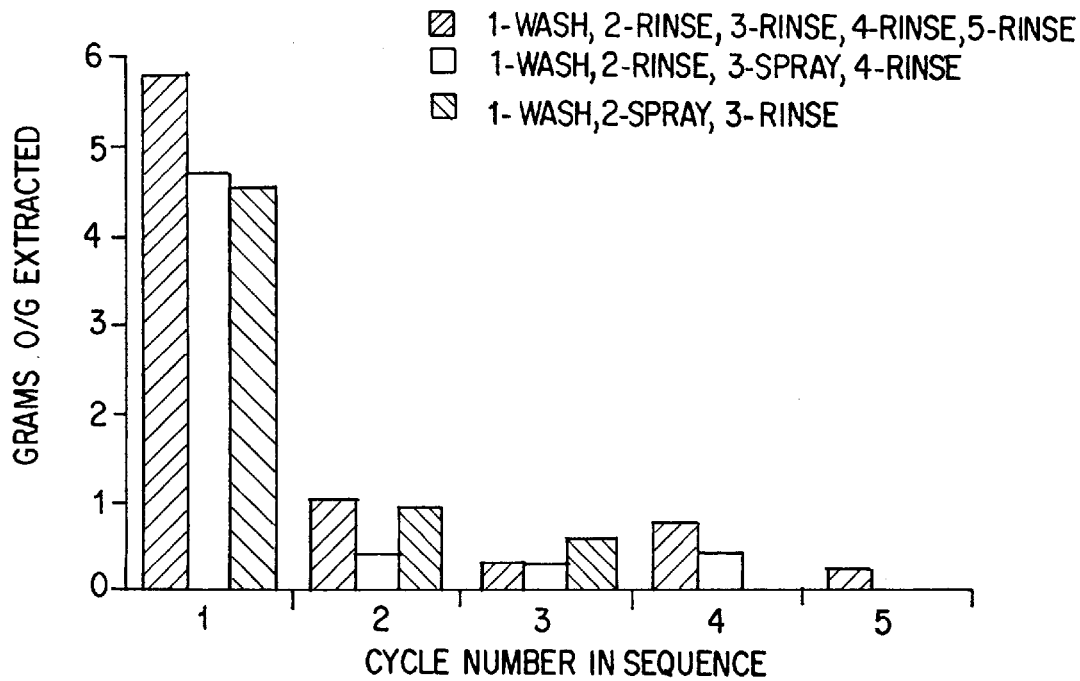
FIG. 4 is a graphical comparison of the clothes-extraction effectiveness of water spray rinses, such as those emanating from the permeate of a membrane filtration gray water recycle system, to full water fill washer agitation cycles for total organics as oil and grease.
Figure 5:
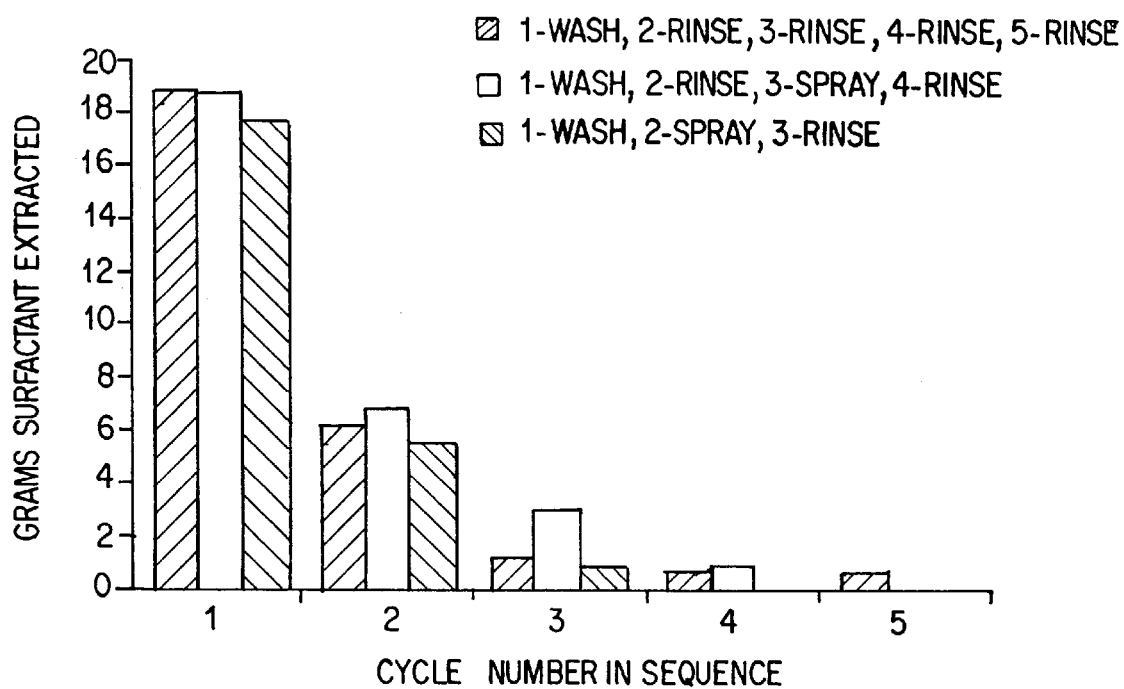
FIG. 5 is a graphical comparison similar to FIG. 4 of the clothes-extraction effectiveness of water spray rinses, such as those emanating from the permeate of a membrane filtration gray water recycle system, to full water fill washer agitation cycles for surfactant.

The present invention provides at least equal or better cleaning performance by way of the permeate recycle spray introduced back onto the clothes for further extraction, again to be recycled through the membrane filtration system to continuously generate permeate. Experiments summarized by FIGS. 4 and 5 compare the total extracted quantities of surfactant commonly found in detergents, vegetable oil, motor oil, and grease. The cycle components are represented in the boxed legend on those figures, and the effectiveness of a spray rinse step compared to a full-fill washer tub cycle are shown. Accordingly, the quantity of these aforementioned components are similar in all cycles where the spray rinse (e.g., generated by the permeate of a membrane filtration recirculation system) is substituted for the full-fill washer agitation cycle. The operation and demonstrated results of this invention have been validated for clothes having cotton or synthetic fiber content.

For carrying out the present invention, a clothes washer or other gray water generator (e.g., carwash, shower) with a closed-loop membrane filtration system is used in the following sequence of events, with the reference numerals referring to the components in FIG. 1:

(1) The dirty, soiled, or otherwise unclean clothes are loaded into a commercial washer tub with the detergent manufacturers recommended quantity of detergent for the given size of the washer and clothes load;

(2) Pump 11 activates and fills the washer tub with water from the previous wash cycle's last rinse;

(3) The washer tub is agitated via the pump/motor 5 as in common operation of domestic or commercial washing machines;

(4) After completion of the water cycle of step (3), the gray water generated during the agitated, full water fill wash cycle is pumped by pump 5 to the processing vessel 3 through the prefilter 6;

(5) The spin motor 5 and the recirculation pump 1 are activated, and permeate valve 10 is opened to impinge clean permeate water onto the clothes;

(6) The cycle can end after completion of the permeate-spray, clothes spin cycle of step (5) or additional rinses can be performed in the following sequence;

(7) The processing vessel 3 empties to a drain line via pump 12, followed by the opening of valve 9 to allow fresh water to fill the washer tub to a predetermined level;

(8) The washer tub is agitated, via the pump/motor 5, as in common operation of domestic or commercial washing machines;

(9) After completion of the rinse cycle of step (8), the gray water generated during the agitated, full-water fill wash cycle is pumped via pump 5 to the processing vessel 3 through the prefilter 6; and

(10) The spin motor 5 and recirculation pump 1 are activated, and permeate valve 10 is opened to impinge clean permeate water onto the clothes.

Total surfactant retained in the vessel 3 after step (10) is approximately 30% of the initial quantity added in step (1). Therefore, the next wash cycle beginning with step (1) requires approximately 30% less detergent per cycle than if the starting water is a full fill of fresh water. Other measured parameters which may be found typical for ultrafiltration membranes used in the reuse and recycle of gray water are emulsified surfactant rejections up to 80%, 70% or greater rejection of organics, 10–20% alkalinity rejection, 10–40% hardness rejection, and a 5–10% drop in pH. A 100,000 MWCO polysulfone UF membrane can supply permeate water at 50–100 gal/ft$^2$day (gfd) at TMP's of 5–10 psid. Measurements with gray water recycle systems presented permeate fluxes of 62 gfd over an equivalent of 50 wash-water extract-spin cycles and 33 rinse-water extract-spin cycles with little or no degradation in fluxes. These are nominal values for the system operating parameters, and are intended only for reference purposes because actual performance will depend on the exact type of membrane used and also operating parameters such as flow rates and pressures.

In general, the best presently contemplated mode of operation for the system is comprised of a hollow fiber membrane filtration column having a molecular weight cut-off (MWCO) between 5,000 and 500,000; a recirculation pump, preferably stainless steel; control valves for the permeate and retentate; and a processing vessel for the gray water. The recycle process for this application is carried out with hollow fiber ultrafiltration cross-flow membrane cartridges capable of withstanding water pH's up to 13 and temperatures up to 160° F.

The system described above utilizes a clothes washer/gray water generator. The composition of gray water is, as above defined, lightly contaminated water containing organics, particulates, and inorganics such as carbonates sulfates, nitrates, and chlorides. The composition of gray water is similar for applications such as carwashes, commercial laundry's, residential clothes washers, residential dishwashers, and shower and bath water; therefore, the present invention applies equally to these gray water streams provided adequate prefiltration steps are taken to remove particulates having dimensions less than the hollow fiber lumen internal diameter, preferably using particulate filtration devices which can remove particulates of 25 microns or greater. Prefilters can be successfully used for particulate and sediment removal prior to admitting the gray water stream to the gray water processing tank and subsequent processing in the membrane filtration recycle loop. These prefilters include, but are not limited to, sand depth filters, diatomaceous earth, screens, paper or polymeric substrates in the form of cartridges.

Figure 6:
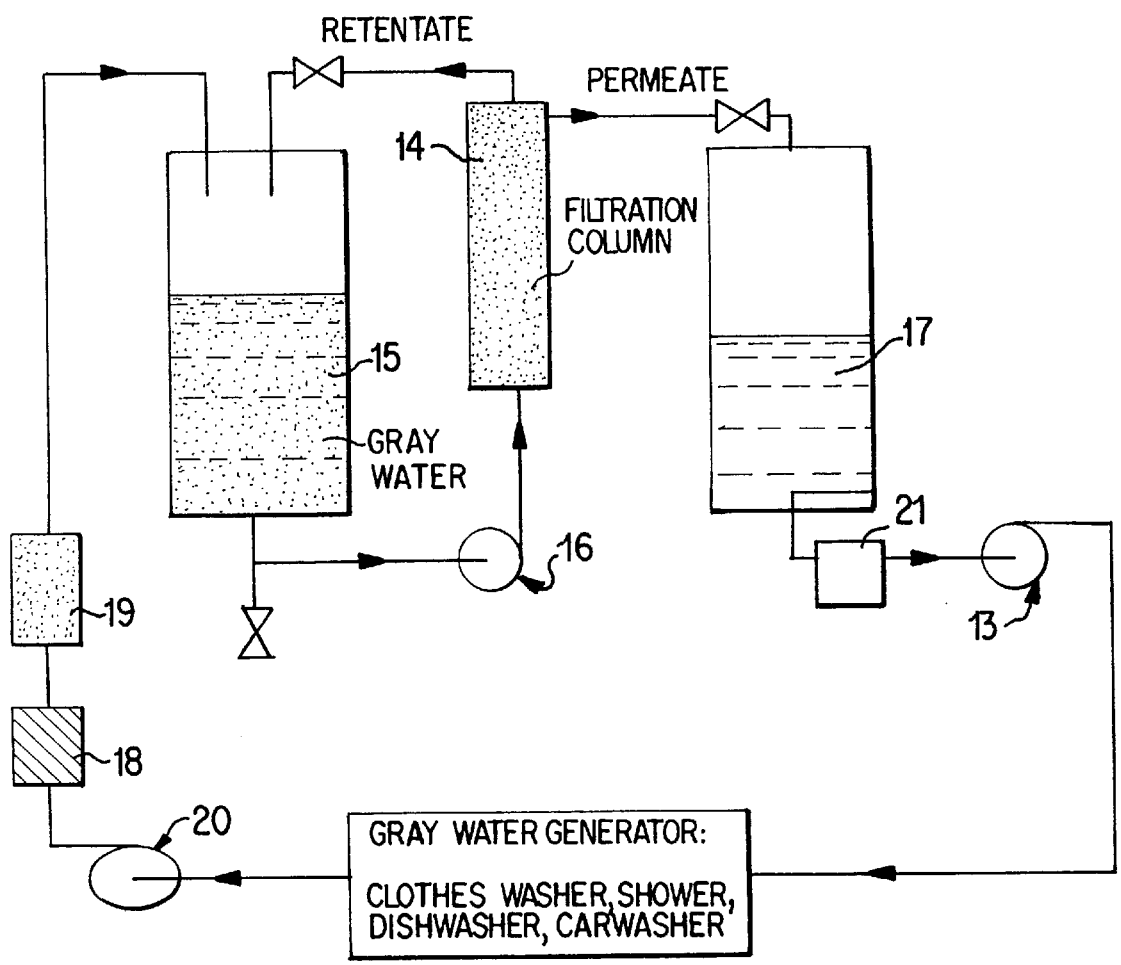
FIG. 6 is a schematic diagram of a presently contemplated preferred embodiment utilizing the present invention for clothes washing, dishwashing, carwashing, and shower water systems.

Referring to FIG. 6, a gray water source such as shower water, bath water, dishwasher discharge, clothes washer discharge, or carwash water, is directed by gravity flow or a mechanical pump 20 to a gray water holding vessel 15. The holding tank 15 is connected by way of plastic or metal plumbing to a recirculation loop which contains a recirculation pump 16 and one or more of the above-described membrane filtration elements 14. Other hardware which can be integrated into the system of FIG. 6 includes conventional control valves for the permeate and retentate, pressure gages, and electronic controls for the control of solenoid valves in a generally known manner. The recirculation pump 16, when activated, produces permeate water which can be used as a direct source or collected into vessel 17. The vessel 17 can also be connected with a transfer pump 13 to supply clean water for re-use as toilet water, lawn watering, clothes washing, or carwashing. Further disinfection and polishing of the water by injection with chlorinated solution, ultraviolet irradiation or biocides will further render this water usable for showers or baths with a conventional polishing apparatus or disinfection unit 21.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for recycling gray water which is continuously generated in a washing tub to which washing water is supplied, comprising the steps of:

operating the washer tub through washing and rinse extraction cycles; flowing the gray water generated during the washing and rinse cycles removed from washed articles in the washing tub to a processing location;

closed-loop filtering the gray water stored in the processing location using ultrafiltration to generate a gray water permeate and a gray water retentate in lieu of a full-fill washer agitation cycle; and immediately flowing the gray water permeate back to the washing tub so as to provide the supply of washing water in the washing tub while flowing the retentate to the processing location to mix with the gray water generated in the washing tub.

2. The process according to claim 1, wherein the filtering takes place through hollow-fiber lumens.

3. The process according to claim 1, wherein the filtration takes place through one of cross-flow, spiral wound and tubular membrane elements.

4. A clothes washer system, comprising:

a washer tub supplied with washing water;

a closed-loop ultrafiltration device that is selectively connected with and that provides permeate to the washer tub as rinsing water;

a gray water processing vessel selectively connected with the washing tub and with the ultrafiltration device to receive gray water from the washing tub and retentate generated by the ultrafiltration device and to provide washing water to the washer tub; and a circulation pump operatively connected between the ultrafiltration device and the gray water processing vessel.

5. The washer system according to claim 4, wherein a fresh water supply is selectively connected with the washer tub.

6. The washer system according to claim 4, wherein a prefilter arrangement is arranged between the washer tub and the gray water processing vessel.

7. The washer system according to claim 4, wherein the ultrafiltration device is a membrane filter arrangement using one of cross-flow, spiral wound and tubular membrane elements.

8. The washer system according to claim 4, wherein the washer tub is one of a top loaded and a front loaded tub.

9. The washer system according to claim 4, wherein the washer tub is a full-water fill, agitated washer tub using a selectable combination of wash and rinse cycles in which one of rinse water and dilutions of the rinse water is provided to the ultrafiltration device for generating permeate water for subsequent use.

\* \* \* \* \*